(12) United States Patent
Nagahara

(10) Patent No.: US 11,989,197 B2
(45) Date of Patent: May 21, 2024

(54) INFORMATION PROCESSING APPARATUS, CONTROL METHOD, AND NON-TRANSITORY STORAGE MEDIUM FOR THE SAME

(71) Applicant: CANON KABUSHIKI KAISHA, Tokyo (JP)

(72) Inventor: Akiko Nagahara, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/815,021

(22) Filed: Jul. 26, 2022

(65) Prior Publication Data

US 2023/0044456 A1 Feb. 9, 2023

(30) Foreign Application Priority Data

Jul. 30, 2021 (JP) ................................. 2021-125162

(51) Int. Cl.
*G06F 16/00* (2019.01)
*G06F 16/22* (2019.01)
*G06F 16/248* (2019.01)

(52) U.S. Cl.
CPC .......... *G06F 16/248* (2019.01); *G06F 16/221* (2019.01); *G06F 16/2282* (2019.01)

(58) Field of Classification Search
CPC ... G06F 16/248; G06F 16/221; G06F 16/2282
USPC .................................................. 707/600–899
See application file for complete search history.

(56) References Cited

U.S. PATENT DOCUMENTS

| | | | |
|---|---|---|---|
| 2010/0208303 A1 | 8/2010 | Itami | |
| 2016/0292240 A1* | 10/2016 | Diwan | G06F 16/254 |
| 2019/0171704 A1* | 6/2019 | Buisson | G06F 16/3325 |
| 2020/0250238 A1* | 8/2020 | Zhang | G06F 16/90348 |
| 2022/0044011 A1* | 2/2022 | Shanmugasundaram | G06T 3/608 |

* cited by examiner

*Primary Examiner* — Michelle N Owyang
(74) *Attorney, Agent, or Firm* — Canon U.S.A., Inc. IP Division

(57) ABSTRACT

An information processing apparatus acquires a plurality of lists including one or more rows from table data including a plurality of columns and a plurality of rows, based on a value of one column in the plurality of columns and extracts, based on a list including a predetermined search key among the acquired plurality of lists, a value corresponding to the search key. Thus, for example, even in a case where there is no character string on the right side of the search key, value information corresponding to the search key is extractable.

10 Claims, 13 Drawing Sheets

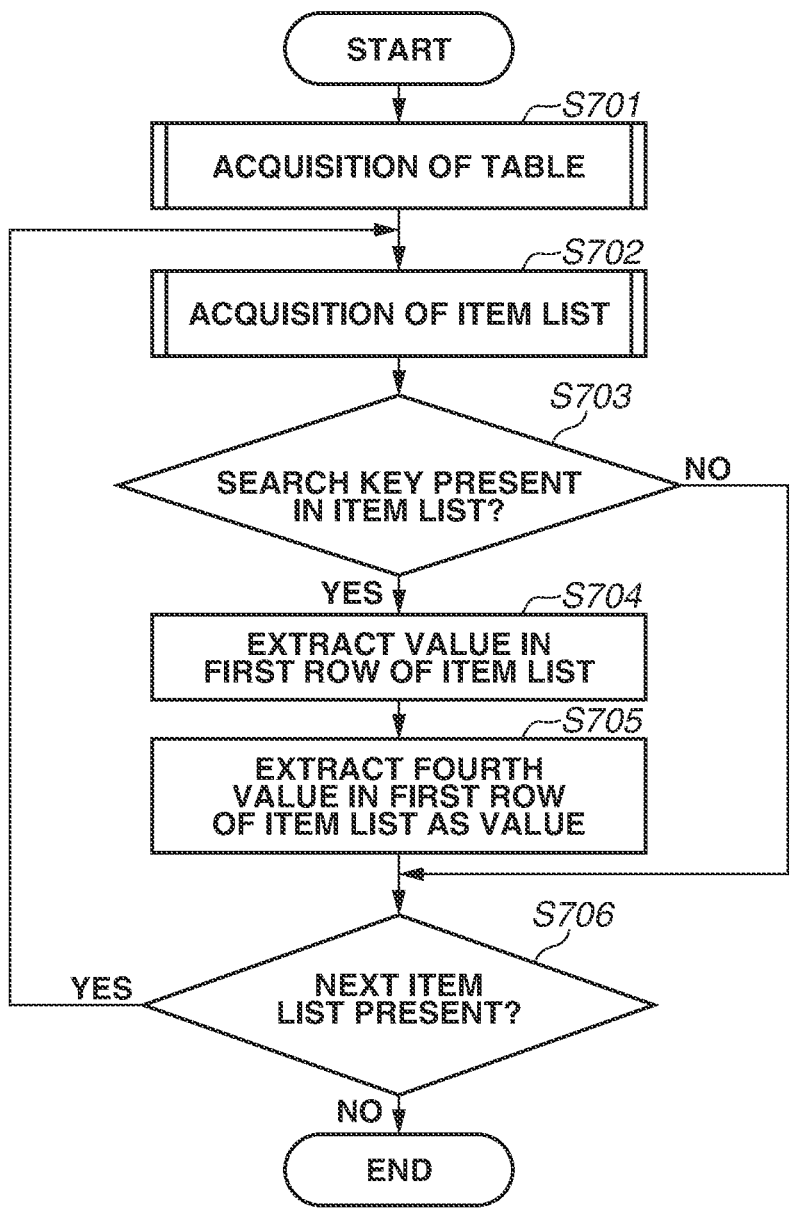

INFORMATION PROCESSING APPARATUS, CONTROL METHOD, AND NON-TRANSITORY STORAGE MEDIUM FOR THE SAME

BACKGROUND

Field

The present disclosure relates to an information processing apparatus for extracting a search key and a value corresponding thereto from table data, a control method, and a non-transitory storage medium.

Description of the Related Art

Conventionally, there is a known technique for extracting a search key such as an item name and a value corresponding thereto from form data and inputting the extracted key and value to a system. For example, there is a known technique for recognizing a table and its structure from the table in a form, searching for a key character string in a predetermined area, and acquiring a character string on a right side (or a lower side) of the searched key character string as a value. As described above, in a case where a processing target is a table in which a key character string and a value character string are arranged side by side, it is easy to extract the value character string corresponding to the key character string.

Meanwhile, there is a case where one item name is described over a plurality of rows in a table, and a character string as a value is described on the right side of the first row of the one item name. For example, a product name of a product item is described over the first and second rows in the table, and a price of the product item is described only on the right side of the first row of the product name. In a situation that a search key to be extracted is described only in the second row of the product name, the value of the price corresponding to the search key cannot be extracted from the right side of the second row of the product name even if a method of extracting a value described on the right side of the same row as the search key is applied.

SUMMARY

According to an aspect of the present disclosure, an information processing apparatus includes at least one memory that stores a program, and at least one processor that executes the program to perform acquiring a plurality of lists including one or more rows from table data including a plurality of columns and a plurality of rows, based on a value of one column in the plurality of columns, and extracting, based on a list including a predetermined search key among the plurality of lists, a value corresponding to the predetermined search key.

Further features of the present disclosure will become apparent from the following description of exemplary embodiments with reference to the attached drawings.

BRIEF DESCRIPTION OF THE DRAWINGS

FIG. 7 is a flowchart illustrating details of processing to be performed by an image processing unit of the system.

DESCRIPTION OF THE EMBODIMENTS

Exemplary embodiments of the present disclosure will be described in detail below with reference to the attached drawings. The exemplary embodiments which will be described below do not restrict the present disclosure according to the claims, and all of combinations of the features described in the exemplary embodiments are not always essential to the means for solution according to the present disclosure.

Figure 1:
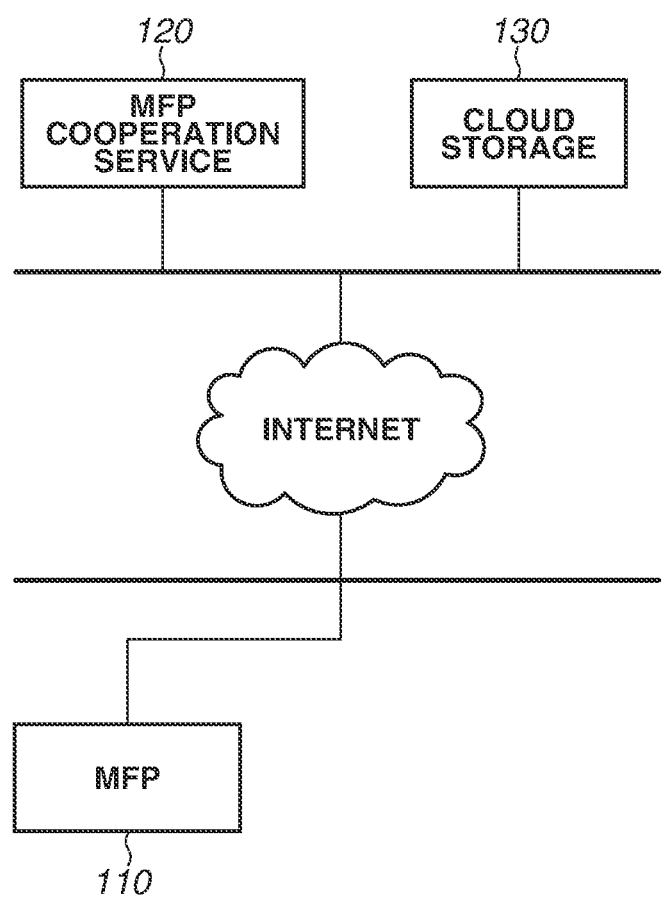
FIG. 1 illustrates an overall configuration of a system.

FIG. 1 illustrates an overall configuration of an image processing system. The image processing system includes a multi-function peripheral (MFP) 110, an MFP cooperation service 120, and a cloud storage 130. The MFP 110 is communicably connected to a server (or cloud) that provides various services (an MFP cooperation service and a storage service) on the Internet via a local area network (LAN).

The MFP 110 has a plurality of functions such as a scanner and a printer and is an example of an image processing apparatus. The MFP cooperation service 120 is an example of a service provided by an information processing apparatus (e.g., a cloud server) that has a function of storing an image file scanned by the MFP 110 in its own server and a function of transmitting the image file to a service such as another storage service that can store a file. The cloud storage 130 is a service that can store a file via the Internet and acquire a file by a web browser.

The image processing system according to the present exemplary embodiment includes the MFP 110, the MFP cooperation service 120, and the cloud storage 130, but is not limited to this configuration. For example, a client personal computer (PC) may transmit image data to the MFP cooperation service 120 instead of the MFP 110. The client PC may also has a role of the MFP cooperation service 120. Further, the MFP cooperation service 120 may be provided by not only an information processing apparatus and the cloud server on the Internet but also a server (an information processing apparatus) on the LAN. The cloud storage 130 may be replaced with an e-mail server and the like, and a scanned image may be attached to an email and transmitted.

Figure 2:
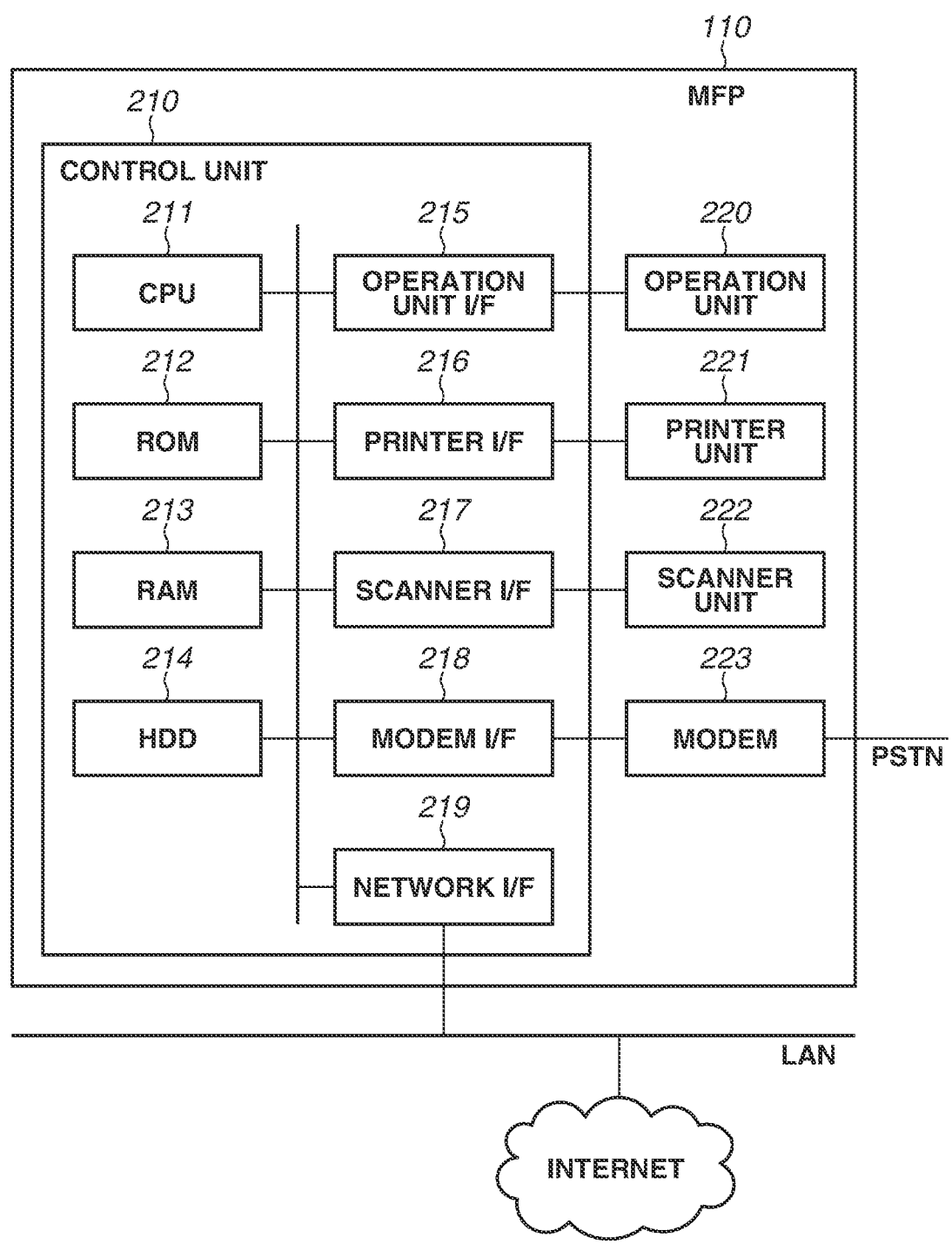
FIG. 2 is a hardware configuration diagram of a multi-function peripheral (MFP).

FIG. 2 is a hardware configuration diagram of the MFP 110. The MFP 110 includes a control unit 210, an operation unit 220, a printer unit 221, a scanner unit 222, and a modem 223. The control unit 210 includes units 211 to 219 described below and controls an entire operation of the MFP 110. A central processing unit (CPU) 211 reads a control program stored in a read-only memory (ROM) 212 and executes and controls various functions of the MFP 110, such as reading, print, and communication. A random access memory (RAM) 213 is used as a main memory and a temporary storage area such as a work area of the CPU 211. According to the present exemplary embodiment, one CPU 211 uses one memory (the RAM 213 or a hard disk drive (HDD) 214) to execute each processing in a flowchart described below, but the present exemplary embodiment is not limited to this configuration. For example, a plurality of CPUs and a plurality of RAMs or HDDs may cooperate to execute each processing. The HDD 214 is a large capacity storage unit that stores image data and various programs. An operation unit interface (I/F) 215 is an interface for connecting the operation unit 220 and the control unit 210. The operation unit 220 is provided with a touch panel, a keyboard, and the like and receives an operation, an input, and an instruction from a user. A printer I/F 216 is an interface for connecting the printer unit 221 and the control unit 210. Image data for printing is transferred from the control unit 210 to the printer unit 221 via the printer I/F 216 and printed on a recording medium. A scanner I/F 217 is an interface for connecting the scanner unit 222 and the control unit 210. The scanner unit 222 generates image data by reading a document set on a document platen or an auto document feeder (ADF), which are not illustrated, and inputs the image data to the control unit 210 via the scanner I/F 217. The MFP 110 can print out (copy) the image data generated by the scanner unit 222 from the printer unit 221 and also transmit a file or an e-mail. A modem I/F 218 is an interface for connecting the modem 223 and the control unit 210. The modem 223 performs facsimile communication of the image data with a facsimile apparatus on a public switched telephone network (PSTN). A network I/F 219 is an interface for connecting the control unit 210 (the MFP 110) to the LAN. The MFP 110 transmits the image data and information to each service on the Internet and receives various types of information using the network I/F 219.

Figure 3:
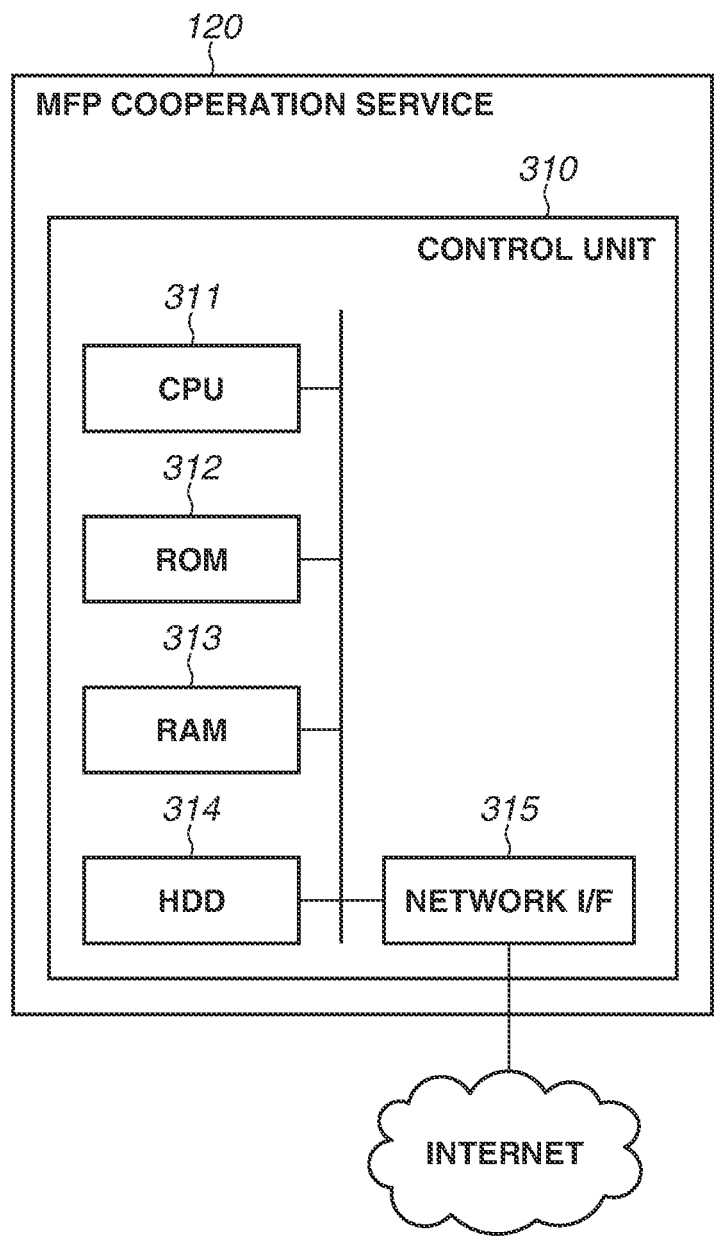
FIG. 3 is a hardware configuration diagram of an MFP cooperation service.

FIG. 3 is a hardware configuration diagram of the MFP cooperation service 120. The MFP cooperation service 120 is an information processing apparatus (a server apparatus) including a CPU 311, a ROM 312, a RAM 313, a HDD 314, and a network I/F 315. The CPU 311 reads a control program stored in the ROM 312 and executes various processing to control an entire operation. The RAM 313 is used as a main memory and a temporary storage area such as a work area of the CPU 311. The HDD 314 is a large capacity storage unit that stores image data and various programs. The network I/F 315 is an interface for connecting the MFP cooperation service 120 to the Internet. The hardware configuration in FIG. 3 is an example, and, as described above, the MFP cooperation service 120 may be realized by cloud computing. The MFP cooperation service 120 and the cloud storage 130 transmit and receive various types of information in response to receiving a processing request from another apparatus (the MFP 110 and the like) via the network I/F 315.

Figure 4:
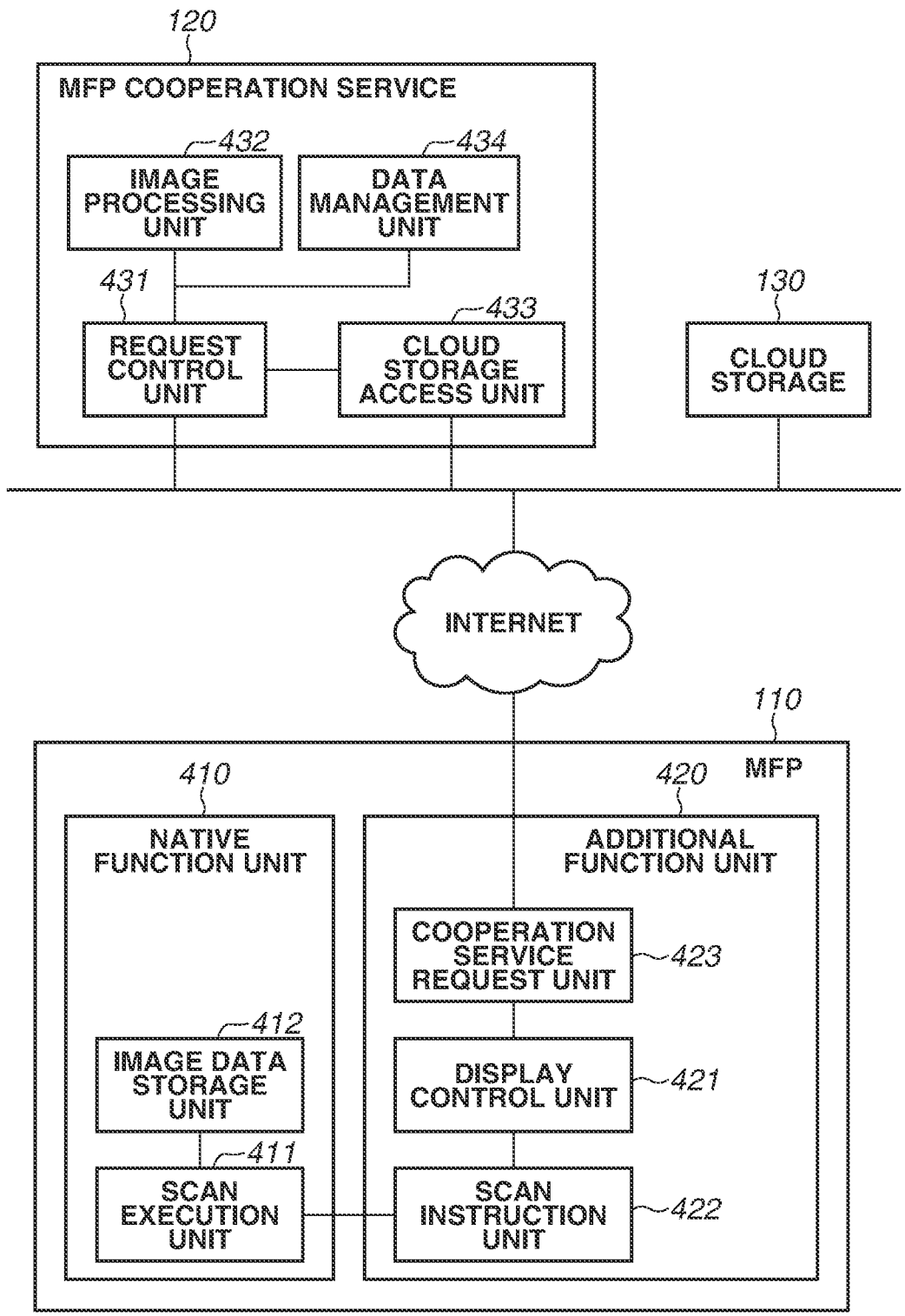
FIG. 4 is a software configuration diagram of the system.

FIG. 4 is a software configuration diagram of the image processing system according to the present exemplary embodiment. The MFP 110 can be roughly divided into two units, a native function unit 410 and an additional function unit 420. While each unit included in the native function unit 410 is provided as standard in the MFP 110, the additional function unit 420 is an application additionally installed on the MFP 110. The additional function unit 420 is an application based on Java (registered trademark) and can easily realize addition of a function to the MFP 110. Another additional application, which is not illustrated, may be installed on the MFP 110. An example of the configuration in which the additional function unit 420 is installed on the MFP 110 has been described, but the present exemplary embodiment is not limited to this configuration.

The native function unit 410 includes a scan execution unit 411 and an image data storage unit 412. The additional function unit 420 includes a display control unit 421, a scan instruction unit 422, and a cooperation service request unit 423.

The display control unit 421 displays a user interface (UI) screen for receiving an operation from a user on a liquid crystal display unit having a touch panel function in the operation unit 220 of the MFP 110. For example, the display control unit 421 displays the UI screen that is used for inputting authentication information for accessing the MFP cooperation service 120, for a scan setting, for an operation to start scan, a preview screen, and the like. The scan instruction unit 422 requests the scan execution unit 411 to perform scan processing together with the scan setting according to a user instruction input via the UI screen.

The scan execution unit 411 receives a scan request including the scan setting from the scan instruction unit 422. The scan execution unit 411 generates scanned image data by reading a document placed on a document positioning glass plate by the scanner unit 222 via the scanner I/F 217 according to the scan request. The generated scanned image data is transmitted to the image data storage unit 412. The scan execution unit 411 transmits a scanned image identifier uniquely indicating the stored scanned image data to the scan instruction unit 422. The scanned image identifier is a number, a symbol, an alphabet, or the like (not illustrated) for uniquely identifying an image scanned in the MFP 110. The image data storage unit 412 stores the scanned image data received from the scan execution unit 411 in the HDD 214.

The scan instruction unit 422 acquires the scanned image data corresponding to the scanned image identifier received from the scan execution unit 411 from the image data storage unit 412. The scan instruction unit 422 requests the cooperation service request unit 423 to instruct the MFP cooperation service 120 to perform processing on the acquired scanned image data.

The cooperation service request unit 423 requests various processing from the MFP cooperation service 120. For example, the cooperation service request unit 423 makes requests for login, analysis of the scanned image, transmission of the scanned image, and the like. Protocols, such as a representational state transfer (REST) protocol and a Simple Object Access Protocol (SOAP), are used in communication with the MFP cooperation service 120, but another communication unit may be used.

The MFP cooperation service 120 includes a request control unit 431, an image processing unit 432, a cloud storage access unit 433, and a data management unit 434.

The request control unit 431 stands by in a state where it can receive a request from an external apparatus. In response to receiving a processing request, the request control unit 431 instructs the image processing unit 432, the cloud storage access unit 433, and the data management unit 434 to perform processing as appropriate in accordance with the request.

The image processing unit 432 performs character area analysis on an image, optical character recognition (OCR), image analysis processing for recognizing a title and the like, image processing such as rotation and tilt correction of the image, processing for recognizing a table in order to extract table data from the image, and extraction processing for recognizing a ruled line and acquiring a row from the recognized table. The image processing unit 432 further has a function of searching for a desired key and a value corresponding to the key.

The cloud storage access unit 433 requests processing with respect to a cloud storage. A cloud service publishes various interfaces for storing a file in the cloud storage and for acquiring the stored file generally using the protocols such as REST and SOAP. The cloud storage access unit 433 operates the cloud storage using an interface of the published cloud storage.

The data management unit 434 stores user information, various types of setting data, a list of a product name and a price, table data extracted by analyzing image data, an item list, and a product name list, which are managed by the MFP cooperation service 120.

The table data managed by the data management unit 434 will now be described. The table data is in a table format acquired by the image processing unit 432. According to the present exemplary embodiment, table data 1 is generated by performing OCR and analysis on the table 605 included in a scanned image in FIG. 6A.

| Table Data 1 | | | |
|---|---|---|---|
| Item Number | Product Name | Quantity | Price |
| 1 | A1 | 1 | 10000 |
| 2 | B1<br>B2 | 1 | 20000 |
| 3 | C1<br>C2 | 1 | 30000 |

The above-described table data 1 includes six rows and four columns. A first row represents a header (a title row), and "item number", "product name", "quantity", and "price" are described. In the following description, an item represents a minimum unit that includes one or more values each corresponding to the header and can be divided for each price. For example, the second row in the table data 1 represents one item in which the item number is 1, the product name is A1, the quantity is 1, and the price is 10000. The third and fourth rows in the table data 1 represent a different one item that includes the item number "2", the product name described in two rows such as "B1" and "B2", the quantity "1", and the price "20000". The fifth and sixth rows in the table data 1 represent a further different one item that includes the item number "3", the product name described in two rows such as "C1" and "C2", the quantity "1", and the price "30000". In the items (products) of the item numbers "2" and "3", the product names are described over a plurality of rows.

The present exemplary embodiment is directed to acquisition of the price "10000" of the product name "A1", the price "20000" of the product name "B2", and the price "30000" of the product name "C2" from the table data 1 by a method described below.

The item list managed by the data management unit 434 will now be described. The item list refers to a list of rows obtained by separating the table data 1 managed by the data management unit 434 for each item. The following three item lists (item lists 1 to 3) are acquired from the table data 1 by repeating operation in step S702 described below. The item lists 1 to 3 are indicated as separate lists below, but this is not restrictive. The table data 1 may be formed such that a separation position is identifiable for each item to be managed as each item list.

| Item List 1 | | | |
|---|---|---|---|
| 1 | A1 | 1 | 10000 |

| Item List 2 | | | |
|---|---|---|---|
| 2 | B1<br>B2 | 1 | 20000 |

| Item List 3 | | | |
|---|---|---|---|
| 3 | C1<br>C2 | 1 | 30000 |

The item list 1 includes the item number, the product name, the quantity, and the price acquired from the first item included in the table data 1. The item list 2 includes the item number, the product name, the quantity, and the price acquired from the second item included in the table data 1. The item list 3 includes the item number, the product name, the quantity, and the price acquired from the third item included in the table data 1.

An example of a product name list 1 managed by the data management unit 434 will now be described.

| Product Name List 1 | |
|---|---|
| Product Name | A1, B2, C2 |

The product name list 1 includes one row and two columns and is created by a user in advance. The first column indicates the product name, and the second column indicates character strings in a comma separated value (CSV) format in which the character strings each indicating a search key of the product name are separated by "," (hereinbelow, referred to as a comma). The product name list 1 includes a search key to be used in operation in step S703 described below. Whether the character string described in the product name in the table data or the item list is the product name included in the product name list 1 is determined in the processing in step S703 described below. For example, the product name B1 in the first row of the item list 2 is not included in "A1", "B2", and "C2" obtained by separating "A1, B2, C2" of the product name list 1 by commas, and thus it is determined that the product name B1 is not a search key. Meanwhile, the product name B2 in the second row of the item list 2 is the product name "B2" included in the product name list 1, and thus it is determined that the product name B2 is a search key. The product name C2 in the second row of the item list 3 is also determined to be a search key included in the product name list 1.

A product name and price list managed by the data management unit 434 will now be described. A product name and price list 1 includes the product names and the prices acquired from the item lists 1, 2, and 3 as a result of execution of an operation in step S704 described below. The following "product name and price list 1" indicates the results of acquiring "A1" and "10000" from the item list 1, "B2" and "20000" from the item list 2, and "C2" and "30000" from the item list 3.

| Product Name and Price List 1 | |
|---|---|
| A1 | 10000 |
| B2 | 20000 |
| C2 | 30000 |

<Overall Processing>

Figure 5:
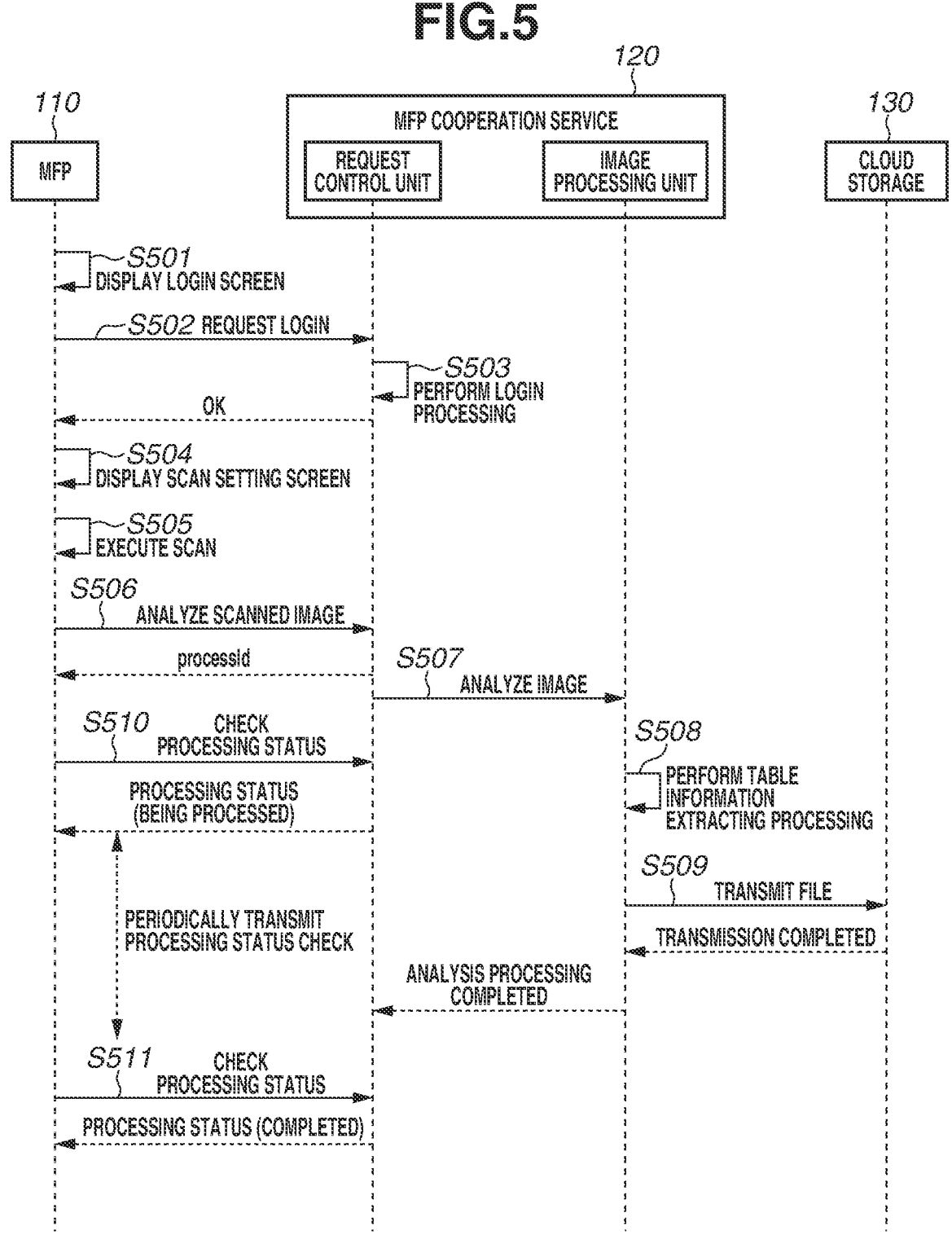
FIG. 5 is a sequence diagram illustrating processing between devices.

FIG. 5 is a sequence diagram illustrating processing to be performed between respective apparatuses in a case where table data is extracted from an image scanned by the MFP 110, converted into a file, and is transmitted to the cloud storage 130.

In FIG. 5, communication between the respective apparatuses is mainly described.

The MFP 110 displays a main screen (not illustrated) in which a button for performing a function is arranged, on the touch panel. An additional application (hereinbelow, referred to as a scan application) for transmitting a scanned image to the cloud storage is installed on the MFP 110, and thus, a button for using a function of the scan application is displayed on the main screen of the MFP 110. If a user presses the button, a login screen (not illustrated) for accessing the MFP cooperation service 120 is displayed, and processing illustrated in FIG. 5 is started.

In step S501, the scan application displays the login screen for inputting authentication information for accessing the MFP cooperation service 120. In step S502, a login request is transmitted from the MFP 110 to the MFP cooperation service 120. In step S503, the MFP cooperation service 120 verifies whether a user name and a password included in the login request match registered user name and password and, if they match with each other, returns an access token to the MFP 110. Various requests to be subsequently made from the MFP 110 to the MFP cooperation service 120 are issued together with this access token, and thus, a user for a processing target can be identified by this information. A method of user authentication is performed by using a generally known method (Basic authentication, Digest authentication, authorization using Open Authorization (OAuth), and the like).

Figure 13:
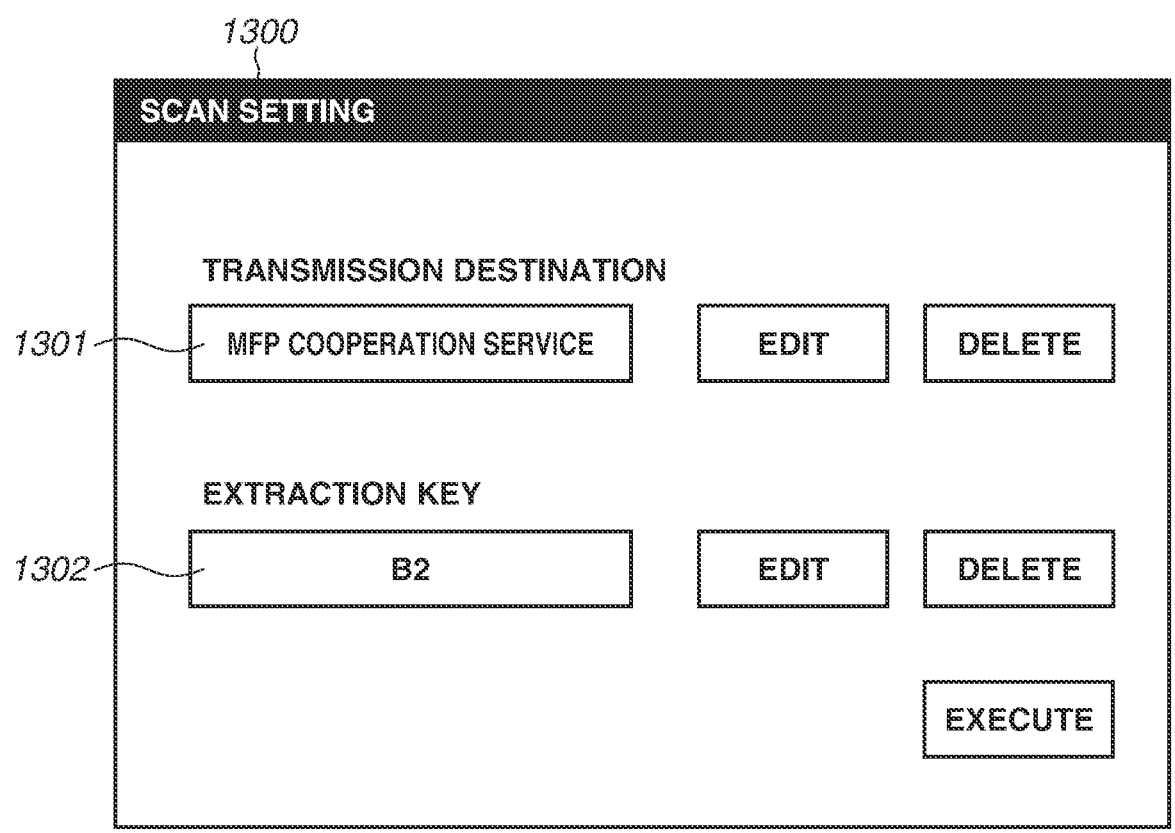
FIG. 13 illustrates an example of a scan setting screen.

When the login process is completed, in step S504, the MFP 110 displays a scan setting screen (FIG. 13). A user performs various settings related to reading in scan, places a paper form to be scanned on the document positioning glass plate or the ADF, and presses a "start scan" button. Then in step S505, scan is executed, and scanned image data is generated by digitizing the paper form.

FIG. 13 illustrates an example of a scan setting screen 1300. A transmission destination of a scanned image is set in an item 1301. An extraction key is input to an item 1302. Setting of the extraction key may be made on the scan setting screen 1300 or on the MFP cooperation service 120, which is the transmission destination. In the example in FIG. 13, only "B2" is input in the item 1302 for the extraction key, but a plurality of values can be set therein. The set value is managed in the above-described product name list 1.

An analysis request of the scanned data is transmitted to the MFP cooperation service 120 together with the scanned data generated by the scan processing in step S506. In response to receiving the analysis request of the scanned data, in step S507, the MFP cooperation service 120 causes the image processing unit 432 of the MFP cooperation service 120 to start image analysis. Subsequently, the MFP cooperation service 120 returns "processId", which is an identifier uniquely indicating the analysis requested to the MFP cooperation service 120, to the MFP 110 without waiting for completion of the image analysis processing. In FIG. 5, processing for transmitting "processId" from the MFP cooperation service 120 to the MFP 110 is performed before the image analysis processing in step S507 is started, but "processId" may be transmitted during execution of the image analysis processing.

The MFP cooperation service 120 receives the analysis request of the scanned data and then performs the image analysis processing using the image processing unit 432. In step S508, in the image analysis processing, the image processing unit 432 initially performs table recognition on the scanned data received in step S506 and extracts a key value from the table data recognized as the table. The operation in step S508 will be described in detail below. In step S509, the image processing unit 432 converts the extracted product name and price list 1 into a file and transmits the file to the cloud storage 130. The file may be a CSV format file of the product name and price list 1, and any other file format can be used.

In steps S510 and S511, the MFP 110 periodically checks a processing status of the image analysis of "processId" with the MFP cooperation service 120 using "processId" that has been received as a response in step S506 (e.g., this operation is performed every several hundred milliseconds to several milliseconds). While it is omitted in FIG. 5, the operation in step S510 is continuously performed until a response of completion of the image processing is received from the MFP cooperation service 120 (until a timing of step S511). If a request for checking the processing status is received in step S511, the MFP cooperation service 120 checks the processing status of "processId" and returns a response indicating that the image processing is completed.

In the response from the MFP cooperation service 120, a character string indicating a current processing status is stored in "status". For example, in a case where "status" is "processing", it indicates that the processing is being performed in the MFP cooperation service 120, and in a case of "completed", it indicates that the processing is completed. Other statuses may also be returned such as "failed" in a case where the processing has failed. Further, a response at the time of completion of the processing (in a case where the status is "completed") includes a result of analysis of the scanned image and information about the scan setting together with the status. The scan setting may include information about the transmission destination to which the scanned image is transmitted. The foregoing is the description of the sequence diagram in FIG. 5.

Figure 6A:
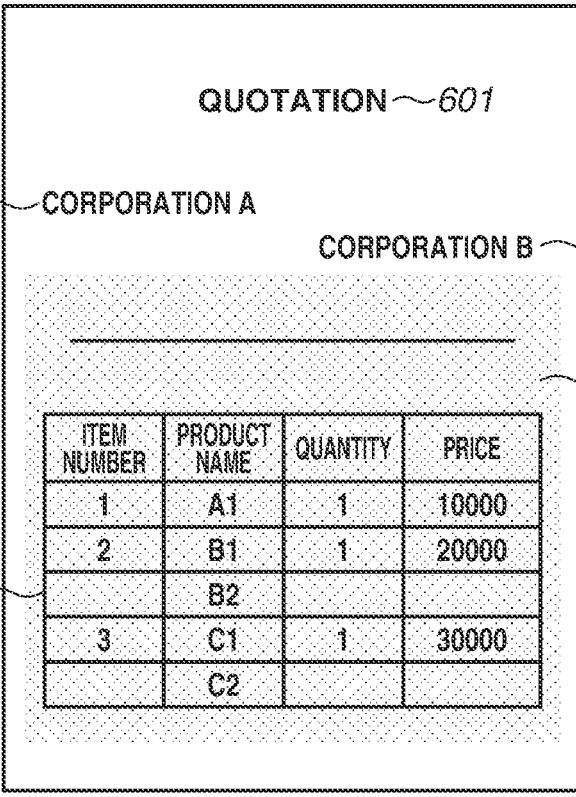
FIGS. 6A and 6B illustrate an example of a document.

FIG. 6A illustrates an example of an image to be analyzed according to the present exemplary embodiment. A document 600 is scanned data generated through the scan processing in step S505. The document 600 includes a document title 601 "quotation", an address 602 "Corporation A", a sender 603 "Corporation B", and a document body 604. The document body 604 includes the table 605. The table 605 is a table to be extracted in a table information extraction process in step S508.

FIG. 7 is a flowchart illustrating details of the image analysis processing to be performed by the image processing unit 432 according to the present system. This processing corresponds to the operation in step S508 in FIG. 5. The processing in this flowchart is executed by the MFP cooperation service 120.

In step S701, the image processing unit 432 acquires all tables in the scanned data. The image processing unit 432 acquires the table 605 from the scan data of the document 600 in the example in FIG. 6A. The processing will be described in detail with reference to FIG. 8.

In step S702, the image processing unit 432 acquires an item to be a target. More specifically, the above-described item lists 1 to 3 are acquired. The processing will be described in detail with reference to FIG. 10.

In step S703, the image processing unit 432 determines whether a desired product name is present in the product name among one item acquired in step S702. For example, the image processing unit 432 determines whether the product name included in the product name list 1 is present in "product name" in the item list 1. If the desired product name is present in the product name (YES in step S703), the processing proceeds to step S704. If the desired product name is not present (NO in step S703), the processing proceeds to step S706.

In step S704, the image processing unit 432 extracts a value in the first row from the item list that is determined to include the desired product name. For example, the item list 2 includes the desired product name "B2" in the second row of "product name", so that values "2, B1, 1, 20000" in the first row of the item list 2 are extracted.

In step S705, the image processing unit 432 extracts the fourth value in the values extracted in step S704 as a target value. In the example of the item list 2, "20000" is extracted as the value. The extracted value is stored in the data management unit 434. The items to be acquired in the present exemplary embodiment are the product name and the price, but are not limited to them. The items to be acquired may be specified in a setting file and the like.

In step S706, the image processing unit 432 determines whether a next item list is present. If a next item list is present (YES in step S706), the processing proceeds to step S702. If the next item list is not present (NO in step S706), the processing of this flowchart is ended. Since the item list 3 next to the item list 2 is present, the result of the determination in step S706 is "YES", but there is no item list next to the item list 3, so that the result of the determination in step S706 is "NO". The foregoing is the description of FIG. 7.

Figure 8:
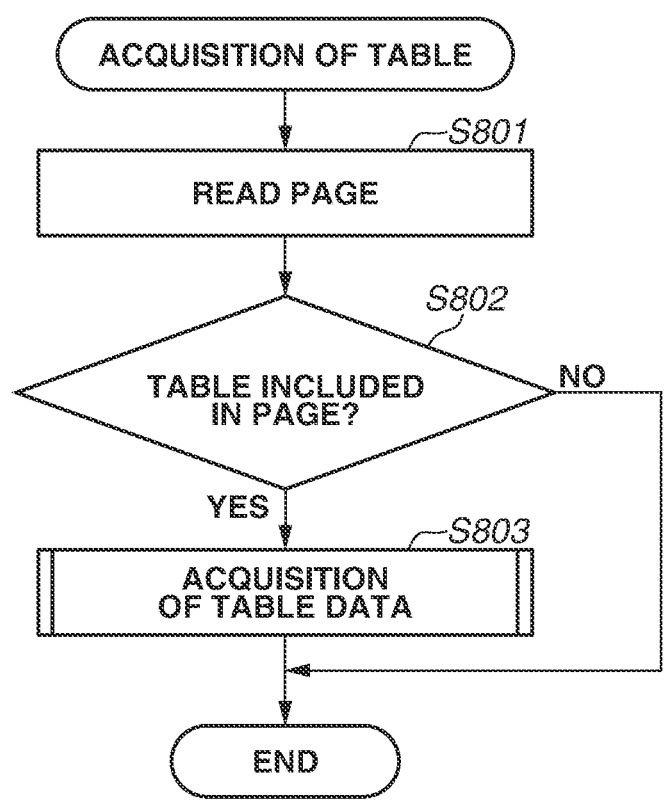
FIG. 8 is a flowchart illustrating details of processing to be performed by the image processing unit of the system.

Acquisition of the table in step S701 according to the present exemplary embodiment will now be described with reference to FIG. 8. The processing in this flowchart is executed by the MFP cooperation service 120.

In step S801, the MFP cooperation service 120 reads a page from the scanned data received from the MFP 110 in step S506. According to the present exemplary embodiment, processing in which the scanned data input from the MFP 110 is used is described, but the scanned data may be directly input to the MFP cooperation service 120 from the outside. The reading of page may be performed on the scanned data generated by the MFP 110 and may be performed by inputting electronic data such as Portable Document Format (PDF) from the outside.

In step S802, the image processing unit 432 determines whether a table is included in the page read in step S801. If a table is included (YES in step S802), the processing proceeds to step S803, and if a table is not included (NO in step S802), the processing of this flowchart is ended. A method for recognizing a table is not limited, but as an example here, in a case where a pixel block having a predetermined threshold value or more is present in an area surrounded by ruled lines, the pixel block is recognized as a character, and an area including the ruled lines is recognized as a table. Areas at the top and bottom of the document in which a date, a page number, a document number, and the like are commonly described in the same document may be excluded from the acquisition of the table.

In step S803, the image processing unit 432 acquires the table data from the table recognized in step S802 and ends the operation in step S701.

Figure 9:
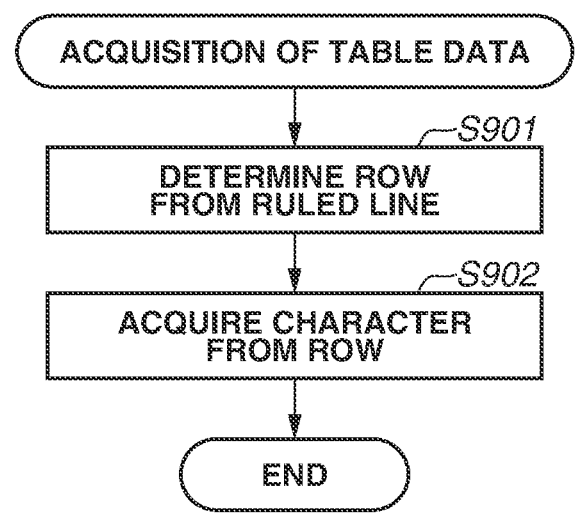
FIG. 9 is a flowchart illustrating details of processing to be performed by the image processing unit of the system.

FIG. 9 is a flowchart illustrating a procedure for acquiring the table data from the table in step S803. The processing in this flowchart is executed by the MFP cooperation service 120. In step S901, the image processing unit 432 determines a row based on the ruled line. A row is a processing unit for a table and includes an item value corresponding to the header. According to the present exemplary embodiment, the item values in the table recognized in step S802 are written horizontally, and thus, the processing unit is a row, but the present exemplary embodiment is not limited to this configuration. In a case where a table is written vertically, the processing unit is the column.

In step S902, the image processing unit 432 acquires the item value row by row, generates the table data 1, stores the table data 1 via the data management unit 434, and ends the processing of this flowchart. According to the present exemplary embodiment, OCR processing is performed row by row, and the item value is acquired column by column, but the present exemplary embodiment is not limited to this configuration.

The item value may be stored in a list format. For example, in a case of the table data 1, the first row of a list includes "item, product name, quantity, price", the second row of the list includes "1, A1, 1, 10000", the third row of the list includes "2, B1, 1, 20000", and the fourth row of the list includes " " "(blank), B2," "(blank)," "(blank)".

Figure 10:
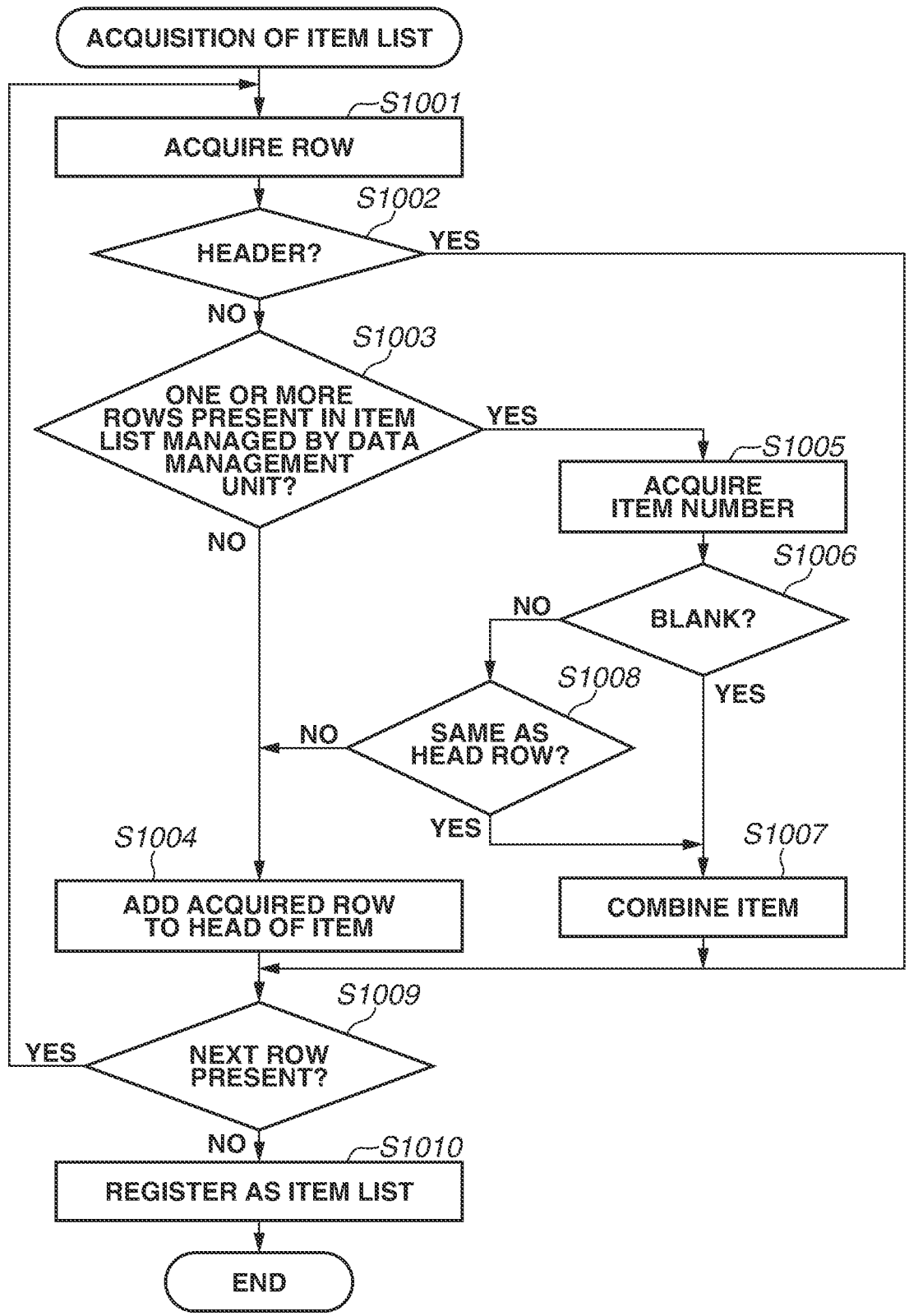
FIG. 10 is a flowchart illustrating details of processing to be performed by the image processing unit of the system.

FIG. 10 is a flowchart illustrating details of a procedure for acquiring each of the item lists 1 to 3 in step S702 according to the present exemplary embodiment. The processing in this flowchart is executed by the MFP cooperation service 120.

In step S1001, the image processing unit 432 acquires the rows of the table data 1 stored in the data management unit 434 in order from the top. In step S1002, the image processing unit 432 determines whether the row acquired in step S1001 is the header. The header according to the present exemplary embodiment represents a row in which a title of each column, such as "item number", "product name", "quantity", and "price" are described. If the row is not the header (NO in step S1002), the processing proceeds to step S1003. If the row is the header (YES in step S1002), the processing proceeds to step S1009.

In step S1003, the image processing unit 432 determines whether one or more rows are present in the item list to be subjected to the processing of the data management unit 434. If one or more rows are not present (NO in step S1003), the processing proceeds to step S1004. If one or more rows are present (YES in step S1003), the processing proceeds to step S1005. The item list is not yet generated at a timing when the second row of the above-described table data 1 is acquired in step S1001, so that a result of the determination in step S1003 is "NO". The processing then proceeds to step S1004, and a new item list is generated. In a case where the third and subsequent rows in the table data 1 are acquired in step S1001, as the item list has been already generated, so that a determination result in step S1003 is "YES".

In step S1004, the image processing unit 432 adds the row acquired in step S1001 to the item list as the head of the item and stores the item list in the data management unit 434.

In step S1005, the image processing unit 432 acquires a value of "item number" in the row acquired in step S1001.

In step S1006, the image processing unit 432 determines whether the value of the item number acquired in step S1005 is blank. If the value is blank (YES in step S1006), the processing proceeds to step S1007. If the value is not blank (NO in step S1006), the processing proceeds to step S1008. In a case where the fourth row in the table data 1 is acquired in step S1001, the product name is "B2", and the item number, the quantity, and the price are all blank. In other words, the item number is blank, and the result of the determination in step S1006 is "YES".

In step S1007, the image processing unit 432 adds the row acquired in step S1001 to the end of the item list stored in the data management unit 434. The data in the third row of the table data 1 has been added to the first row of the item list 2 at a timing when the fourth row of the table data 1 is acquired in step S1001, so that the data ("(blank)" "B2" "(blank)" "(blank)") in the fourth row of the table data 1 are added to the second row of the item list 2.

In step S1008, the image processing unit 432 determines whether the value of the item number acquired in step S1005 is the same as that of the item number at the head of the item list already managed in the data management unit 434. If the values are the same (YES in step S1008), the processing proceeds to step S1007. If the values are not the same (NO in step S1008), the processing proceeds to step S1004. For example, the item number is "2" at the head of the item list 2 already managed in the data management unit 434, and in a case where the fifth row of the table data 1 is acquired in step S1001, the item number in the fifth row acquired from the table data 1 is "3", so that the image processing unit 432 determines that the item numbers are different (NO in step S1008), and the processing proceeds to step S1004. The processing in step S1008 is performed in order to determine whether the row acquired in step S1001 is to be combined with the item already managed as the item list in the data management unit 434. If the item number is different, the item is managed as a different item, and if the item number is the same or blank, the item is combined to the item list already generated and managed as the same item.

In step S1009, the image processing unit 432 determines whether the next row is present. If the next row is present (YES in step S1009), the processing proceeds to step S1001. If the next row is not present (NO in step S1009), the processing proceeds to step S1010. In step S1010, the item list is registered, and then the processing of this flowchart is ended.

The present disclosure is implemented through the above-described processing procedure, and thus an item list for each item can be generated from the table data. In a case where a value corresponding to a search key is extracted, in step S703, an item list including the specified search key is determined, and, in steps S704 and S705, the value is acquired based on the value in the first row of the determined item list. Accordingly, even in a case where there is no character string on the right side of the search key, value information corresponding to the search key can be extracted.

A second exemplary embodiment of the present disclosure will be described below. A detailed description will be provided, with reference to drawings, of the second exemplary embodiment in which a value corresponding to a specified key is obtainable from a table divided into a plurality of pages by appropriately using the present disclosure. In the descriptions of the present exemplary embodiment, descriptions of parts of which the configuration or the processing procedure is similar to those according to the first exemplary embodiment are omitted, and only parts different from the first exemplary embodiment are described.

U.S. Patent Application Publication US2010/0208303A1 discusses a technique for merging objects split over a plurality of pages and laying out the merged object again with a reduced size thereof. However, according to this conventional technique, a case where the same header row (a row in which a name of each column is described) is described in each table on each divided page is not considered.

According to the second exemplary embodiment, a processing target is a document including a plurality of printed pages in which a table is divided into a plurality of printed pages depending on a format of the document. In a case where a table is present across pages, all the tables in each page in the document are acquired. If there is no header row in the table on the second and the subsequent pages, it is determined that the header is the same as that on the previous page, the tables acquired from each page are combined as they are, and the combined table is analyzed. By contrast, in a case where the header row is present also in the tables on the second and the subsequent pages and is the same as the header row of the table on the first page, the header rows are omitted from the tables on the second and the subsequent pages, the tables are then combined, and the combined table is analyzed.

Figure 6B:
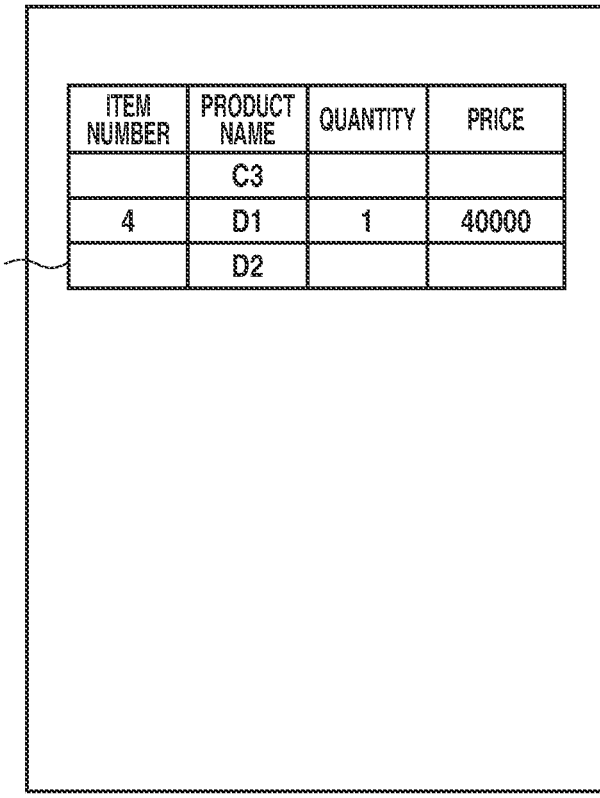

FIG. 6B illustrates an example of an image to be analyzed according to the present exemplary embodiment. A document 610 corresponds to the second page of the document 600. A table 611 is present in in the document 610 and includes data following the table 605.

Table data 2 described below is acquired from the table 611. The table data 2 is in a table format acquired by the image processing unit 432 in step S803.

| Table Data 2 | | | |
|---|---|---|---|
| Item Number | Product Name | Quantity | Price |
| 4 | C3<br>D1<br>D2 | 1 | 40000 |

The table data 2 includes four rows and four columns. The first row represents the header (the title row) and includes the item number, the product name, the quantity, and the price. The product name "C3" is described in the second row of the table data 2, and other columns are blank. The third and fourth rows of the table data 2 represent one item in which the item number is "4", the product names are "D1" and "D2", the quantity is "1", and the price is "40000".

The second exemplary embodiment is directed to acquisition of the product name and the corresponding price from the table across a plurality of pages. For example, in a case where the product name "C3" is specified as the search key and its price is to be acquired as a value, the table data 2 does not include information about the price corresponding to the product name "C3", so that it is difficult to extract the value corresponding to a key (the product name "C3" in this case).

Thus, table data 3 is generated by combining the table data 1 and the table data 2 through processing described below. In a case where the headers of the table data 1 and the table data 2 are the same, the image processing unit 432 combines the table data 1 and the table data 2 in a state in which the header of the table data 2 is omitted, and thus table data 3 having the common header is generated. The table data 3 is managed by the data management unit 434.

| Table Data 3 | | | |
| --- | --- | --- | --- |
| Item Number | Product Name | Quantity | Price |
| 1 | A1 | 1 | 10000 |
| 2 | B1 | 1 | 20000 |
|   | B2 |   |   |
| 3 | C1 | 1 | 30000 |
|   | C2 |   |   |
|   | C3 |   |   |
| 4 | D1 | 1 | 40000 |
|   | D2 |   |   |

The table data 3 includes nine rows and four columns. The first row represents the header and includes "item number", "product name", "quantity", and "price". In the second row of the table data 3, data related to the first item is described in which the item number is "1", the product name is "A1", the quantity is "1", and the price is "10000".

In the third to fourth rows in the table data 3, data related to the second item is described in which the item number is "2", the product names are "B1" and "B2", the quantity is "1", and the price is "20000".

In the fifth to seventh rows in the table data 3, data related to the third item is described in which the item number is "3", the product names are "C1", "C2", and "C3", the quantity is "1", and the price is "30000".

In the eighth and ninth rows in the table data 3, data related to the fourth item is described in which the item number is "4", the product names are "D1" and "D2", the quantity is "1", and the price is "40000".

The data management unit 434 manages an item list organized for each item from the table data 3. The item lists generated from the table data 3 are the item lists 1 and 2 described in the first exemplary embodiment and the following item lists 4 and 5.

| Item List 4 | | | |
| --- | --- | --- | --- |
| 3 | C1 | 1 | 30000 |
|   | C2 |   |   |
|   | C3 |   |   |

| Item List 5 | | | |
| --- | --- | --- | --- |
| 4 | D1 | 1 | 40000 |
|   | D2 |   |   |

The item list 4 is generated based on the data in the fifth to seventh rows of the table data 3. The item list 5 is generated based on the data in the eighth and ninth rows of the table data 3.

Subsequently, a product name list 2 managed by the data management unit 434 according to the second exemplary embodiment is described.

| Product Name List 2 |
| --- |
| Product Name        A1, B2, C3, D2 |

The product name list 2 includes one row and two columns. The first column represents the product name, and the second column describes each character string indicating the search key for the product name separated by commas. For example, the product name "C3" in the third row of the above-described item list 4 is determined to be the search key included in the product name list 2 in step S703 in FIG. 7. The product name "D2" in the second row of the item list 5 is also determined to be the search key included in the product name list 2.

According to the present exemplary embodiment, a description of parts duplicated with the first exemplary embodiment are omitted. A method of acquiring a table according to the second exemplary embodiment is different from that described according to the first exemplary embodiment (step S701), and thus, the operation in step S701 will be described in detail with reference to FIG. 11. The operations similar to those already described in conjunction with the first exemplary embodiment are denoted by the same reference numeral, and the descriptions thereof are omitted.

Figure 11:
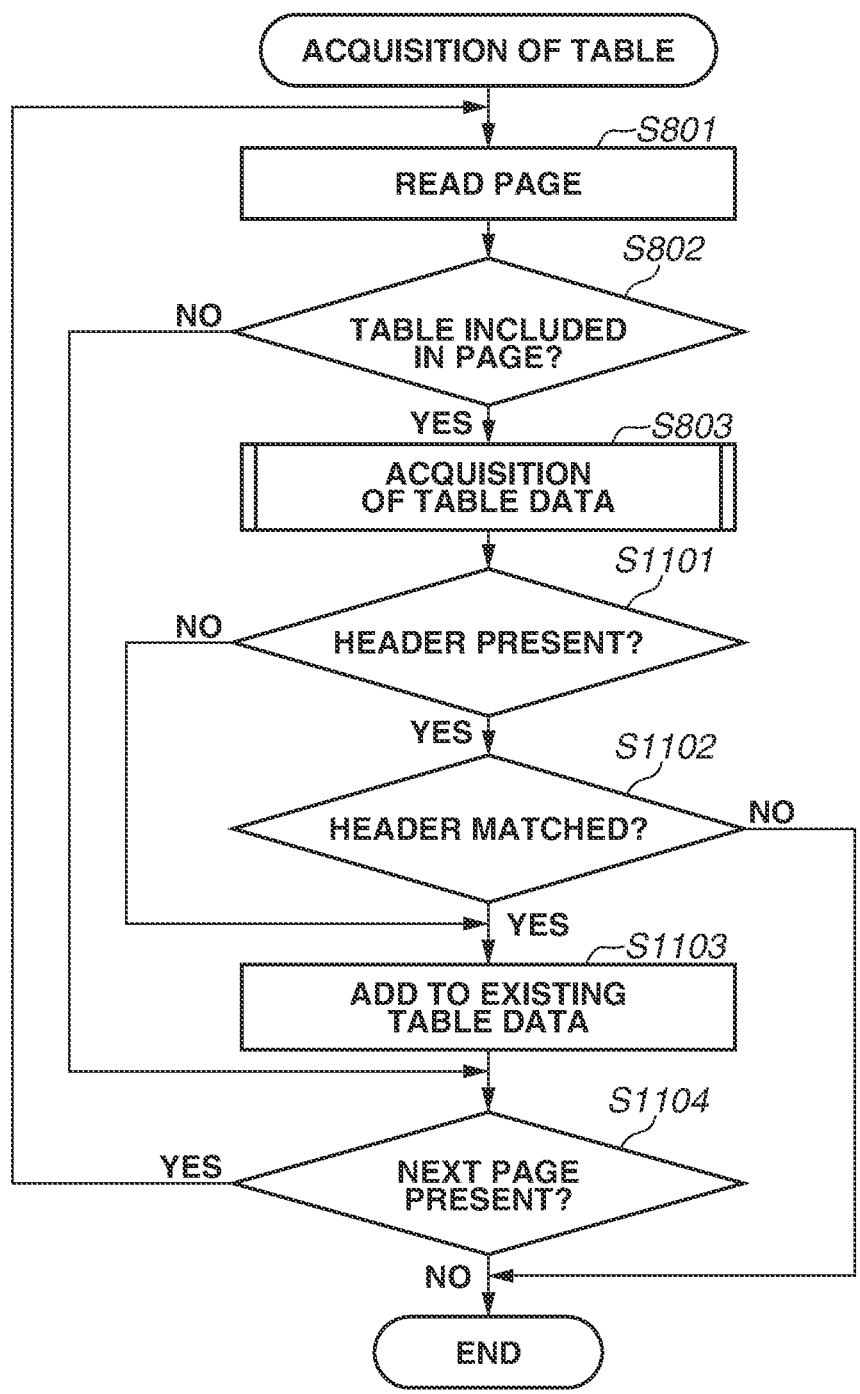
FIG. 11 is a flowchart illustrating details of processing to be performed by the image processing unit of the system.

In FIG. 11, after the table data is acquired in step S803, in step S1101, the image processing unit 432 determines whether the header is present in the first row of the table data acquired in step S803. If the image processing unit 432 determines that the header is present (YES in step S1101), the processing proceeds to step S1102. If the image processing unit 432 determines that the header is not present (NO in step S1101), the processing proceeds to step S1103. In a case where the first row in the table data acquired in step S803 is not the header, the image processing unit 432 can determine that the table data acquired in step S803 is continued because the header is common to the existing table data.

In step S1102, the image processing unit 432 determines whether the first row in the table data acquired in step S803 matches the header of the existing table data stored in the data management unit 434. If the headers match each other (YES in step S1102), the processing proceeds to step S1103. If the headers do not match each other (NO in step S1102), the processing of this flowchart is ended.

In step S1103, the image processing unit 432 combines the table data acquired in step S803 with the existing table data and stores the combined table data in the data management unit 434. In step S1102, if the image processing unit 432 determines that the headers match each other, the table data in the second and the subsequent rows excluding the header determined to be matched is added to the existing table data. For example, the header in the first row of the table data 2 acquired based on the table 611 in FIG. 6B matches the header of the table data 1 acquired based on the table 605 in FIG. 6A. Thus, the data in the second and subsequent rows excluding the header of the table data 2 are added to the table data 1, and thus, the above-described table data 3 can be obtained.

In step S1104, the image processing unit 432 determines whether the next page is present. If the next page is present (YES in step S1104), the processing proceeds to step S801. If the next page is not present (NO in step S1104), the processing of this flowchart is ended.

The present disclosure is implemented as described above, and thus a table divided into a plurality of pages can be combined in a state in which the duplicate header is excluded from the second and the subsequent pages. The processing in FIG. 7 described in the first exemplary embodiment is applied to the combined table data, and thus even in a case where there is no character string on the right side of the search key, value information corresponding to the search key can be extracted.

A third exemplary embodiment of the present disclosure will be described below. A detailed description will be provided, with reference to drawings, of the third exemplary embodiment in which processing of acquiring table data from a table that is not surrounded by ruled lines can be executed through appropriate application of the present disclosure. According to the present exemplary embodiment, descriptions of parts of which the configurations or the processing procedures are similar to those according to the first and the second exemplary embodiments are omitted, and only parts different from the first and the second exemplary embodiments will be described.

The present exemplary embodiment relates to a processing unit used for acquiring table data from a table recognized in step S701. According to the first exemplary embodiment, the items are surrounded by the ruled lines as illustrated in the table 605, and the image processing unit 432 determines the row based on the ruled lines and sets it to the processing unit. However, there may be a table without ruled lines depending on a type of a document. Thus, in order to acquire table data regardless of the ruled line, an interval between character strings is used to determine a height of a row that is a processing unit for the table data.

According to the present exemplary embodiment, the processing for acquiring the table data described in step S803 will be described in the flowchart of the table information extraction processing described in step S508 according to the first exemplary embodiment.

Figure 12:
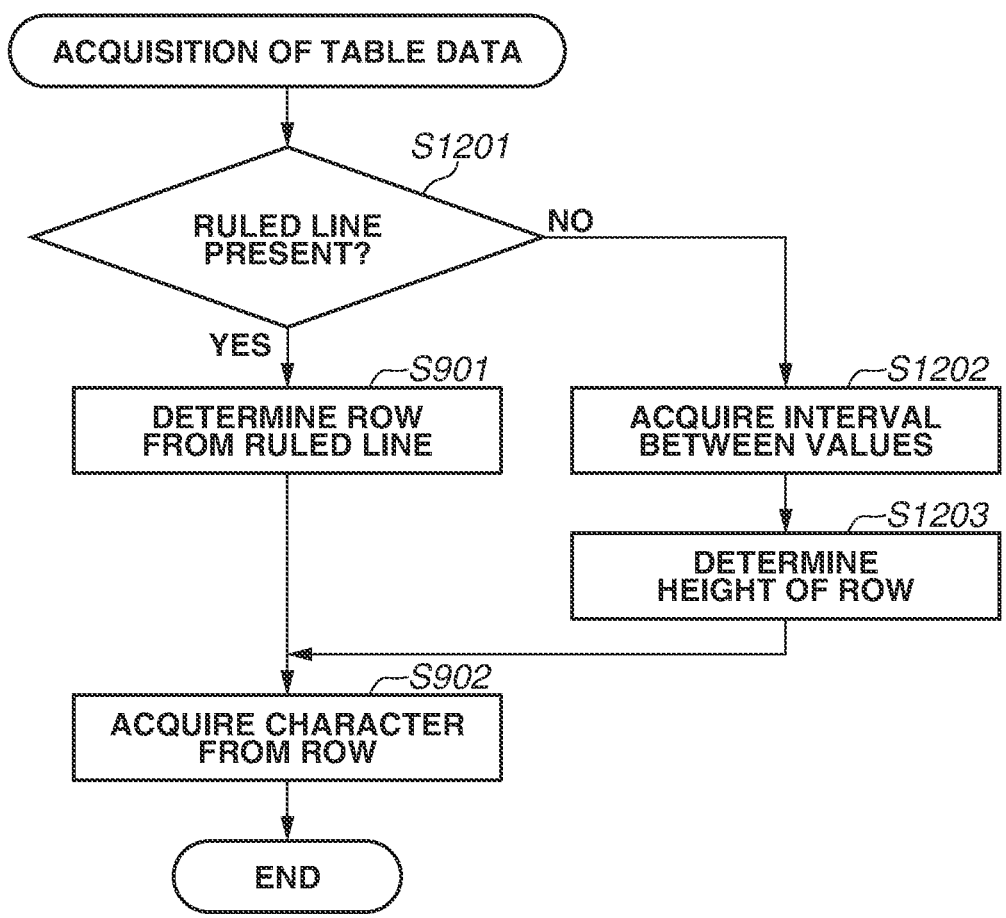
FIG. 12 is a flowchart illustrating details of processing to be performed by the image processing unit of the system.

FIG. 12 is a flowchart illustrating a table data acquisition procedure in step S803 according to the present exemplary embodiment. The processing in this flowchart is executed by the MFP cooperation service 120.

In step S1201, the image processing unit 432 determines whether a ruled line is present. If a ruled line is present (YES in step S1201), the processing proceeds to step S901. If a ruled line is not present (NO in step S1201), the processing proceeds to step S1202.

In step S1202, the image processing unit 432 acquires intervals between two adjacent character strings indicating the price. The intervals of adjacent character strings indicating the price in the document 600 are intervals between 10000 and 20000 and between 20000 and 30000.

In step S1203, the image processing unit 432 determines a row to be the processing unit and stores the row in the data management unit 434. According to the present exemplary embodiment, OCR processing is performed, and a height including a character size and a margin of the character size or less in an area in which the price is located is regarded as a row. The margin may be determined so that the interval between the character strings of the price acquired in step S1202 is approximately an integer multiple of each row. Determination of a height of a row is not limited to the character string indicating the price. A character size may be determined from distribution of pixels or may be set from the outside.

The present disclosure is implemented through the above-described processing procedure, and thus a table that is not surrounded by ruled lines is analyzed, and table data can be acquired.

Other Exemplary Embodiment

The present disclosure can also be realized by executing the following processing. More specifically, software (a program) for realizing the functions of the above described exemplary embodiments is supplied to a system or an apparatus via a network or various storage media and a computer (or a CPU or a micro processing unit (MPU)) of the system or the apparatus reads and executes the program. In this case, the computer program and the storage media storing the computer program constitutes the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-125162, filed Jul. 30, 2021, which is hereby incorporated by reference herein in its entirety.

What is claimed is:

1. An information processing apparatus comprising:
at least one memory that stores a program; and
at least one processor that executes the program to perform:
obtaining a row of a table data in order, the table data comprising a plurality of columns and a plurality of rows;
determining whether a first predetermined column in the obtained row is blank or not;
acquiring a plurality of lists by separating the table data based on a result of the determining, wherein each of the acquired plurality of lists includes the plurality of columns and one or more rows;
determining a list including a predetermined search key from the acquired plurality of lists, wherein the determined list includes the predetermined search key in any row; and
extracting, as a target value corresponding to the predetermined search key, a value of a second predetermined column in a first row from the determined list.

2. The information processing apparatus according to claim 1,
wherein the predetermined search key includes a plurality of search keys generated in advance, and wherein the at least one processor determines one or more lists including each of the plurality of search keys and extracts a value corresponding to each of the plurality of search keys from each of the determined lists.

3. The information processing apparatus according to claim 1, wherein the value of the first predetermined column is an item number.

4. The information processing apparatus according to claim 3, wherein the plurality of lists is acquired by adding a row in which the item number in the table data is blank or a row in which the item number in the table data is the same as the item number in a previous row, to a same list as the previous row.

5. The information processing apparatus according to claim 4, wherein the plurality of lists is acquired by further managing, as a row belonging to a new list, a row that has been determined to be neither the row in which the item number in the table data is blank nor the row in which the item number in the table data is the same as the item number in the previous row.

6. The information processing apparatus according to claim 1,
wherein, in a case where a second table is present on a next page of one page including a first table corresponding to the table data and a header of table data corresponding to the second table matches a header of table data corresponding to the first table, the at least one processor executes adding a portion of the table data corresponding to the second table excluding the header to the table data corresponding to the first table and acquiring, based on the value of one column in the plurality of columns, a plurality of lists including one or more rows from the table data after the addition; and
extracting, based on the list including the predetermined search key among the plurality of lists, a value corresponding to the predetermined search key.

7. The information processing apparatus according to claim 1, further comprising a reception unit configured to receive scanned data from an image processing apparatus having at least a scan function,
wherein the table data is acquired from the received scanned data.

8. The information processing apparatus according to claim 1, wherein the information processing apparatus is a server or a server by cloud computing.

9. A method for controlling an information processing apparatus, the method comprising:
obtaining a row of a table data in order, the table data comprising a plurality of columns and a plurality of rows;
determining whether a first predetermined column in the obtained row is blank or not;
acquiring a plurality of lists by separating the table data based on a result of the determining, wherein each of the acquired plurality of lists includes the plurality of columns and one or more rows;
determining a list including a predetermined search key from the acquired plurality of lists, wherein the determined list includes the predetermined search key in any row; and
extracting, as a target value corresponding to the predetermined search key, a value of a second predetermined column in a first row from the determined list.

10. A non-transitory computer readable storage medium storing a program, wherein the program causes a computer of information processing apparatus to perform;
obtaining a row of a table data in order, the table data comprising a plurality of columns and a plurality of rows;
determining whether a first predetermined column in the obtained row is blank or not;
acquiring a plurality of lists by separating the table data based on a result of the determining, wherein each of the acquired plurality of lists includes the plurality of columns and one or more rows;
determining a list including a predetermined search key from the acquired plurality of lists, wherein the determined list includes the predetermined search key in any row; and
extracting, as a target value corresponding to the predetermined search key, a value of a second predetermined column in a first row from the determined list.

\* \* \* \* \*